United States Patent
Xie et al.

(10) Patent No.: US 9,849,533 B2
(45) Date of Patent: Dec. 26, 2017

(54) HYBRID DIFFUSION-BRAZING PROCESS AND HYBRID DIFFUSION-BRAZED ARTICLE

(71) Applicant: GENERAL ELECTRIC COMPANY, Schenectady, NY (US)

(72) Inventors: Liangde Xie, Simpsonville, SC (US); Ronald Lee Souther, Campobello, SC (US); Mark Lawrence Hunt, Simpsonville, SC (US); Steven Charles Woods, Easley, SC (US)

(73) Assignee: General Electric Company, Schenectady, NY (US)

( * ) Notice: Subject to any disclaimer, the term of this patent is extended or adjusted under 35 U.S.C. 154(b) by 958 days.

(21) Appl. No.: 13/905,669

(22) Filed: May 30, 2013

(65) Prior Publication Data
US 2014/0356056 A1    Dec. 4, 2014

(51) Int. Cl.
*B23K 1/00* (2006.01)
*B23K 1/002* (2006.01)
(Continued)

(52) U.S. Cl.
CPC ............ *B23K 1/0018* (2013.01); *B22F 7/064* (2013.01); *B23K 1/002* (2013.01); *B23K 1/005* (2013.01);
(Continued)

(58) Field of Classification Search
CPC .................................................. B23K 1/0018
See application file for complete search history.

(56) References Cited

U.S. PATENT DOCUMENTS 3,033,973 A  *  5/1962  Herbert, Jr. .......... B23K 1/0014
                                                              219/243
5,299,353 A      4/1994  Nazmy et al.
(Continued)

FOREIGN PATENT DOCUMENTS

EP          0024142 A1      2/1981
EP          1238742 A1      9/2002
(Continued)

OTHER PUBLICATIONS

European Search Report and Written Opinion issued in connection with corresponding EP Application No. 14169250.9-1702 dated Aug. 5, 2015.

*Primary Examiner* — Devang R Patel
(74) *Attorney, Agent, or Firm* — McNees Wallace & Nurick LLC

(57) ABSTRACT

A hybrid diffusion-brazing process and hybrid diffusion-brazed article are disclosed. The hybrid diffusion-brazing process includes providing a component having a temperature-tolerant region and a temperature-sensitive region, brazing a braze material to the temperature-tolerant region during a localized brazing cycle, then heating the component in a furnace during a diffusion cycle. The brazing and the heating diffusion-braze the braze material to the component, and the localized brazing cycle is performed independent of the diffusion cycle in the hybrid diffusion-brazing process. The hybrid diffusion-brazed article includes a component, and a braze material diffusion-brazed to the component with a filler material. The filler material has a melting temperature that is above a tolerance temperature of the component.

16 Claims, 1 Drawing Sheet

(51) Int. Cl.
    *B23K 1/008*     (2006.01)
    *B23K 1/005*     (2006.01)
    *B23K 20/02*     (2006.01)
    *B22F 7/06*     (2006.01)
    *F01D 5/00*     (2006.01)
    *B23K 101/00*     (2006.01)
    *B23P 6/00*     (2006.01)
    *B22F 5/04*     (2006.01)

(52) U.S. Cl.
    CPC ............ *B23K 1/008* (2013.01); *B23K 1/0056* (2013.01); *B23K 20/026* (2013.01); *B22F 5/04* (2013.01); *B23K 2201/001* (2013.01); *B23P 6/007* (2013.01); *F01D 5/005* (2013.01); *F05D 2230/236* (2013.01); *F05D 2230/237* (2013.01); *F05D 2230/31* (2013.01); *Y10T 403/479* (2015.01)

(56) References Cited

U.S. PATENT DOCUMENTS

| | | | |
|---|---|---|---|
| 5,913,555 A | 6/1999 | Richter et al. | |
| 6,520,401 B1* | 2/2003 | Miglietti | B23K 1/0018 228/194 |
| 6,575,349 B2* | 6/2003 | Van Esch | B23K 1/0018 228/119 |
| 6,649,887 B2* | 11/2003 | Budinger | B23K 1/002 219/615 |
| 6,814,544 B2 | 11/2004 | Tsukamoto | |
| 6,920,673 B2 | 7/2005 | Allen et al. | |
| 7,293,689 B2 | 11/2007 | Mayers | |
| 7,892,370 B2 | 2/2011 | Ott et al. | |
| 7,896,986 B2 | 3/2011 | Kottilingam et al. | |
| 8,066,173 B2 | 11/2011 | Clark et al. | |
| 8,360,302 B2 | 1/2013 | Richter | |
| 2005/0218196 A1 | 10/2005 | Mayers | |
| 2009/0140030 A1* | 6/2009 | Amancherla | B23K 35/0233 228/208 |
| 2011/0076151 A1* | 3/2011 | Cui | B23K 1/0056 416/232 |
| 2012/0125980 A1 | 5/2012 | Richter et al. | |

FOREIGN PATENT DOCUMENTS

| | | |
|---|---|---|
| EP | 1367147 A1 | 12/2003 |
| EP | 1584398 A1 | 10/2005 |
| EP | 1894658 A1 | 3/2008 |
| EP | 2047940 A1 | 4/2009 |
| EP | 2087961 A1 | 8/2009 |
| EP | 2103799 A1 | 9/2009 |
| EP | 2171124 B1 | 9/2011 |
| WO | 199111285 A1 | 8/1991 |

\* cited by examiner

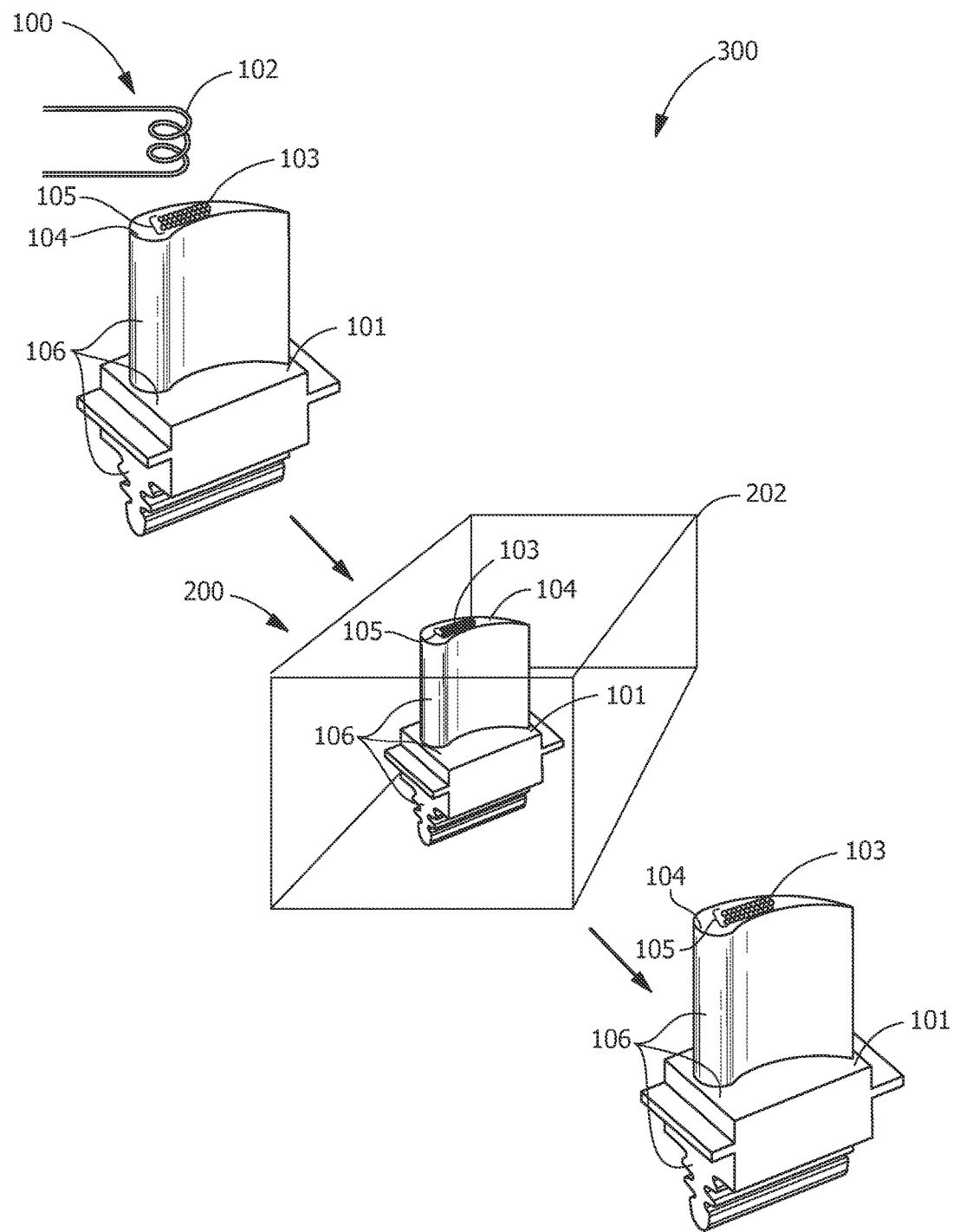

HYBRID DIFFUSION-BRAZING PROCESS AND HYBRID DIFFUSION-BRAZED ARTICLE

FIELD OF THE INVENTION

The present invention is directed to brazing processes and brazed articles. More particularly, the present invention is directed to diffusion-brazing processes and diffusion-brazed articles.

BACKGROUND OF THE INVENTION

Multiple components and/or members are often attached to each other for a variety of reasons. One method of securing multiple components together includes a brazing cycle. The brazing cycle includes a single heating source that provides a temperature high enough to melt a filler material. Upon removal of the single heating source, the melted filler material solidifies, securing any component contacting the filler material.

The single heating source heats the entire component, such that the temperature required to melt the filler material must be less than a temperature at which the component and/or member are damaged. Thus, use of the single heating source limits filler material selection and/or process temperature selection, otherwise the component and/or member is damage during heating.

The above mentioned process temperature restrictions limit filler material selection which limits available braze properties.

A brazing process and a brazed article that do not suffer from one or more of the above drawbacks would be desirable in the art.

BRIEF DESCRIPTION OF THE INVENTION

In an exemplary embodiment, a hybrid diffusion-brazing process includes providing a component having a temperature-tolerant region and a temperature-sensitive region, brazing a braze material to the temperature-tolerant region during a localized brazing cycle, then heating the component in a furnace during a diffusion cycle. The brazing and the heating diffusion-braze the braze material to the component, and the localized brazing cycle is performed independent of the diffusion cycle in the hybrid diffusion-brazing process.

In another exemplary embodiment, a hybrid diffusion-brazing process includes providing a component having a temperature-tolerant region and a temperature-sensitive region, brazing a braze material to the temperature-tolerant region of the component during a localized brazing cycle, then heating the component in a furnace during a diffusion cycle. The localized brazing cycle is at a brazing temperature that melts a filler material in the temperature-tolerant region of the component, and the diffusion cycle is at a diffusion temperature that heats the component to facilitate diffusion of the filler material.

In another exemplary embodiment, a hybrid diffusion-brazed article includes a component, and a braze material diffusion-brazed to the component with a filler material. The filler material has a melting temperature that is above a tolerance temperature of the component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a perspective view of a component during a hybrid diffusion-brazing process, according to an embodiment of the disclosure.

Wherever possible, the same reference numbers will be used throughout the drawings to represent the same parts.

DETAILED DESCRIPTION OF THE INVENTION

Provided are exemplary brazed processes and brazed articles. Embodiments of the present disclosure, in comparison to processes and articles not using one or more of the features described herein, permit increased brazing temperatures to be used, decrease impact of increased brazing temperature on existing brazing joint, decrease impact of increased brazing temperature on sub-component material capability, increase quality of braze repair, increase braze consistency, decrease repair costs, reduce repair cycle time, or a combination thereof.

Referring to FIG. 1, in one embodiment, a localized brazing cycle (step 100) and a diffusion cycle (step 200) form a hybrid diffusion-brazing process 300. The hybrid diffusion-brazing process 300 includes, but is not limited to, a repair process, a manufacturing process, or a combination thereof. The localized brazing cycle (step 100) includes brazing a braze material 103 to a temperature-tolerant region 105 of a component 101. The diffusion cycle (step 200) includes heating the component 101 in a furnace 202. The localized brazing cycle (step 100) is performed independently from the diffusion cycle (step 200) permitting the diffusion-brazing of the braze material 103 to the temperature-tolerant region 105 at higher temperatures, without damaging the component 101.

A localized heating source 102 provides a brazing temperature during the localized brazing cycle (step 100). The localized heating source 102 is any suitable device for providing the brazing temperature. For example, in one embodiment, the localized heating source 102 is an induction coil, an arc melting member, a localized heating member, a laser beam, an electron beam, a microwave heating device, a high temperature flame, a radiation heating member, or a combination thereof. Positioning of the localized heating source 102 decreases exposure of a temperature-sensitive region 106 to the brazing temperature. In one embodiment, the localized heating source 102 is positioned proximal to the braze material 103 in the temperature-tolerant region 105, and distal from the temperature-sensitive region 106.

In one embodiment, a tolerance temperature of the temperature-sensitive region 106 is below the brazing temperature of the localized brazing cycle (step 100). The decreased exposure of the temperature-sensitive region 106 to the brazing temperature maintains the temperature-sensitive region 106 below the tolerance temperature as the brazing temperature is increased. The tolerance temperature is the highest temperature at which damage to a material does not occur. Damage to the component 101 includes, but is not limited to, micro-structural change, macro-structural change, melting, re-melting of existing braze joint, deformation, coating spallation, separation of sub-components, cracking, warping, or a combination thereof. For example, the temperature-sensitive region 106 spalls, fatigues, cracks, warps, deforms, melts, or a combination thereof upon exposure to brazing temperatures at or above the tolerance temperature. The maintaining of the temperature-sensitive region 106 below the tolerance temperature reduces or eliminates damage to the component 101.

The temperature-sensitive region 106 includes any portion of the component 101 outside of the temperature-tolerant region 105. In one embodiment, the temperature-tolerant region 105 has a composition that differs from the temperature-sensitive region 106. In one embodiment, the composition of the temperature-tolerant region 105 is similar or substantially-similar to the temperature-sensitive region 106. In another embodiment, the temperature-sensitive region 106 includes an existing brazing joint. The differing compositions of the temperature-tolerant region 105 and the temperature-sensitive region 106 provide differing tolerance temperatures. Additionally, differing load requirements during service provide differing tolerance temperatures for the same or differing compositions. The tolerance temperature of the temperature-tolerant region 105 is higher than the tolerance temperature of the temperature-sensitive region 106. The increased tolerance temperature of the temperature-tolerant region 105 reduces damage to the temperature-tolerant region 105 from heat at the brazing temperature, as compared to the temperature-sensitive region 106.

Suitable tolerance temperatures of the temperature-sensitive region 106 include, but are not limited to, between about 1600° F. and about 2050° F., between about 1800° F. and about 2100° F., between about 1900° F. and about 2100° F., between about 1950° F. and about 2150° F., between about 2000° F. and about 2200° F., between about 2025° F. and about 2300° F., or any combination, sub-combination, range, or sub-range thereof.

The brazing temperature of the localized brazing cycle (step 100) is any suitable temperature at or above which the braze material 103 is brazed to the component 101. In one embodiment, the brazing temperature for the braze material 103 is higher than the tolerance temperature of the temperature-sensitive region 106. Suitable brazing temperatures include, but are not limited to, between about 1800° F. and about 2400° F., between about 2100° F. and about 2400° F., between about 2050° F. and about 2300° F. between about 2100° F. and about 2300° F., between about 2150° F. and about 2300° F., between about 2200° F. and about 2400° F., between about 2200° F. and about 2300° F., or any combination, sub-combination, range, or sub-range thereof.

The localized brazing cycle (step 100) is any suitable duration, such as, but not limited to between about 1 minute and about 60 minutes, between about 5 minutes and about 30 minutes, between about 15 minutes and about 30 minutes, between about 20 minutes and about 40 minutes, about 10 minutes, about 15 minutes, about 20 minutes, about 30 minutes, or any suitable combination, sub-combination, range, or sub-range therein.

In one embodiment, the diffusion cycle (step 200) includes positioning the component 101 within a furnace 202. The furnace 202 includes, but is not limited to, a vacuum furnace, a retort furnace, an inert gas protected furnace, or a combination thereof. The furnace 202 provides a diffusion temperature that is decreased as compared to the brazing temperature provided by the localized heating source 102. The diffusion temperature includes any suitable temperature capable of facilitating the diffusion cycle (step 200). Suitable diffusion temperatures include, but are not limited to, between about 1800° F. and about 2200° F., between about 1900° F. and about 2050° F., between about 1950° F. and about 2150° F., between about 2000° F. and about 2200° F., or any combination, sub-combination, range, or sub-range thereof.

The diffusion cycle (step 200) distributes melting point depressants, such as, but not limited to boron, silicon, or any combination thereof. The melting point depressants are distributed in the filler material throughout the braze material 103 and surrounding areas in the component 101. The melting point depressant(s) in the filler material diffuse into the braze material 103 and surrounding areas in the component 101, to reduce localized concentrations of melting point depressant(s) in the filler material. In one embodiment, the diffusion of the melting point depressants in the filler material will decrease or eliminate the size and/or amount of regions with lower melting point in the component 101 and/or the braze material 103.

In one embodiment, the component 101 is a gas turbine component, such as a turbine bucket having a bucket tip 104. For example, in one embodiment, a crack in the bucket tip 104 of a stage 2 bucket on a series 9H General Electric gas turbine (9H S2) is repaired through brazing at the braze temperature provided by the localized heating source 102. The 9H S2 bucket tip 104 is repaired using a mixture of 60% nickel-based superalloy (such as MarM 247) and 40% nickel brazing alloy (such as DF4B). The braze temperature is 2215° F. and is directed towards the braze material 103, brazing the braze material 103 to the 9H S2 bucket tip 104. The temperature-sensitive region 106 of the 9H S2 bucket tip 104 is maintained below the tolerance temperature of the temperature-sensitive region 106 as the brazing temperature is directed towards the braze material 103.

The braze material 103 is any suitable braze material or materials. In one embodiment, the braze material 103 is a pre-sintered preform (PSP), a PSP chiclet, a PSP foil, other suitable PSP structure, a flexible tape made from mixed braze powders, a paste made from the mixed braze powders, a dry mixture of the mixed braze powders, or a combination thereof.

The component 101, the braze material 103, and/or layers forming the braze material 103 include any combination of compositions selected from the embodiments disclosed below.

In one embodiment, the braze material 103 has a composition, by weight, of about 12% to about 20% Pd, about 0.1% to about 5% B/Si, about 2% to about 16% Al, about 7% to about 15% Cr, a balance of Ni, and incidental impurities.

In one embodiment, the braze material 103 has a composition, by weight, of about 12% to about 20% Pd, about 0.1% to about 5% B/Si, about 2% to about 16% Al, about 7% to about 15% Cr, about 3% to about 10% Ti, a balance of Ni, and incidental impurities.

In one embodiment, the braze material 103 has a composition, by weight, of about 12% to about 20% Pd, about 0.1% to about 5% B/Si, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the braze material 103 has a composition, by weight, of about 12% to about 20% Pd, about 0.1% to about 5% B/Si, about 2% to about 16% Al, about 7% to about 15% Cr, about 3% to about 10% Ti, about 1% to about 15% Co, balance of Ni.

In one embodiment, the braze material 103 has a composition, by weight, of about 12% to about 20% Pd, about 0.1% to about 2% B, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the braze material 103 has a composition, by weight, of about 12% to about 20% Pd, about 2% to about 5% Si, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the braze material 103 has a composition, by weight, of about 10% to about 15% Pd, about 3% to about 5% Si, about 15% to about 28% Ti, about 10% to about 18% Zr, a balance of Ni, and incidental impurities.

In one embodiment, the braze material 103 has a composition, by weight, of about 12% to about 20% Pd, about 0.1% to about 5% B/Si, about 2% to about 16% Al, about 7% to about 15% Cr, about 0.5% to about 2.5% Ta, a balance of Ni, and incidental impurities.

In one embodiment, the braze material 103 has a composition, by weight, of about 6.4% Al, about 9.3% Co, about 15.6% Cr, about 0.9% Mo, about 1.0% Ta, about 6% Ti, about 1.3% W, about 0.5% C, a balance of Ni, and incidental impurities.

In one embodiment, the braze material 103 has a composition, by weight, of about 0.15% to about 0.19% C, about 13.7% to about 14.3% Cr, about 9.0% to about 10.0% Co, about 4.8% to about 5.2% Ti, about 2.8% to about 3.2% Al, about 3.7% to about 4.3% W, about 3.7% to about 4.3% Mo (with about 7.7% minimum W and Mo combined), a balance of Ni.

In one embodiment, the braze material 103 has a composition, by weight, of up to between about 0.02% to about 0.05% C (or more specifically 0% C), between about 8% and about 23% Cr (or more specifically between about 14.8% and about 15.8% Cr or at about 15.3% Cr), between about 4% and about 18% Co (or more specifically, between about 9.5% and about 11.0% Co or at about 10.25% Co), between about 1.5% and about 6.0% Ta (or more specifically, between about 3.0% and about 3.8% Ta or at about 3.4% Ta), between about 1.0% and about 6.0% Al (or more specifically, between about 3.2% and about 3.7% Al or 3.45% Al), between about 0.3% and 1.5% B (or more specifically, between about 0.8 and about 1.2% B or 1.0% B), between about 2.0% and about 6.0% Si (or more specifically, between about 3.5% and 4.1% Si or about 3.8% Si), a balance of Ni, and incidental impurities.

In one embodiment, the braze material 103 has a composition, by weight, of between about 11.45% and about 12.05% Co, between about 6.6% and about 7.0% Cr, between about 5.94% and about 6.3% Al, between about 1.3% and about 1.7% Mo, between about 4.7% and about 5.0% W, between about 6.2% and about 6.5% Ta, between about 2.6% and about 3.0% Re, between about 1.3% and about 1.7% Hf, between about 0.10% and about 0.14% C, up to about 0.02% Ti, a balance of Ni, and incidental impurities.

In one embodiment, the braze material 103 has a composition, by weight, of between about 0.13% and about 0.19% C, between about 13.7% and about 14.3% Cr, between about 9.0% and about 10.0% Co, between about 4.6% and about 5.2% Ti, between about 2.8% and about 3.2% Al, between about 0.5% and about 0.8% B, between about 4.2% and about 4.8% Si, a balance of Ni, and incidental impurities.

In one embodiment, the braze material 103 has a composition, by weight, of up to about 0.01% C, between about 18.5% and 19.5% Cr, up to about 0.03% B, between about 9.8% and about 10.3% Si, a balance of Ni, and incidental impurities.

In one embodiment, the braze material 103 has a composition, by weight, of between about 8% and about 23% Cr, between about 4% and about 18% Co, between about 1.5% and about 6.0% Ta, between about 1.0% and about 6.0% Al, between about 0.3% and about 1.5% B, between about 2.0% and about 6.0% Si, up to about 0.2% C, a balance of Ni, and incidental impurities.

In one embodiment, the material 103 has a composition, by weight, of between about 0.15% and about 0.19% C, between about 13.7% and about 14.3% Cr, between about 9.0% and 10.0% Co, between about 4.8% and 5.2% Ti, between about 2.8% and about 3.2% Al, between about 3.7% and about 4.3% W, between about 3.7% and about 4.3% Mo (or more specifically, more than about 7.7% W and Mo combined), a balance Ni, and incidental impurities.

In one embodiment, the braze material 103 has a composition, by weight, of between about 0.10% and about 0.14% C, between about 6.6% and about 7.0% Cr, about 11.45% Co, up to about 0.2% Ti, between about 6.2% and about 6.5% Ta, between about 5.94% and about 6.3% Al, between about 4.7% and about 5.0% W, between about 1.3% and about 1.7% Mo, between about 1.3% and about 1.7% Hf, between about 2.6% and about 3.0% Re, a balance of Ni, and incidental impurities.

In one embodiment, the braze material 103 has a composition, by weight, of between about 0.01 and about 0.03% C, between about 7.4% and about 7.8% Cr, between about 2.9% and about 3.3% Co, between about 5.3% and about 5.6% Ta, between about 7.6% and about 8.0% Al, between about 3.7% and about 4.0% W, between about 0.01% and about 0.02% B, between about 0.12% and about 0.18% Hf, between about 1.5% and about 1.8% Re, between about 0.5% and about 0.6% Si, a balance of Ni, and incidental impurities.

In one embodiment, the braze material 103 has a composition, by weight, of up to about 0.05% C, between about 14.8% and about 15.8% Cr, between about 9.5% and about 11.0% Co, between about 3.0 and about 3.8% Ta, between about 3.2% and about 3.7% Al, between about 2.1% and about 2.5% B, a balance of Ni, and incidental impurities.

In one embodiment, the braze material 103 has a composition, by weight, of up to about 0.01% C, between about 18.5% and about 19.5% Cr, up to about 0.03% B, between about 9.8% and about 10.3% Si, a balance of Ni, and incidental impurities.

In one embodiment, the braze material 103 has a composition, by weight, of about 50.25% Ni, about 42% Fe, about 4.5% Si, about 3.25% B, and incidental impurities.

In one embodiment, the material 103 has a composition, by weight, of between about 15.0% and about 17.0% Mo, between about 14.5% and about 16.5% Cr, between about 4.0% and about 7.0% Fe, between about 3.0% and about 4.5% W, up to about 2.5% Co, a balance Ni, and incidental impurities.

In one embodiment, the braze material 103 has a composition, by weight, of between about 9% and about 11% Co, between about 7% and about 9% Cr, between about 9 and about 11% W, between about 2.5% and about 3.5% Ta, between about 5% and about 6% Al, between about 0.5% and about 1.5% Ti, between about 0.6% and about 0.8% Mo, between about 1.3% and about 1.7% Hf, between about 0.03% and about 0.08% Zi, between about 0.01% and about 0.02% B, between about 0.13% and about 0.17% C, a balance Ni, and incidental impurities.

In one embodiment, the braze material 103 has a composition, by weight, of between about 19% and about 21% Cr, between about 2.5% and about 3.5% Ta, between about 2.5% and about 3.5% B, between about 0.003% and about 0.005% Y, a balance of Ni, and incidental impurities.

In one embodiment, the braze material 103 has a composition, by weight, of about 0.1% C, about 22% Cr, about 9% Mo, about 0.5% W, about 1% Co, about 19% Fe, a balance Ni, and incidental impurities.

In one embodiment, the braze material 103 has a composition, by weight, of about 0.1% C, about 22% Cr, about 2% Mo, about 14% W, about 0.3% Al, about 0.5% Mn, about 0.4% Si, about 0.02% La, a balance Ni, and incidental impurities.

In one embodiment, the braze material 103 has a composition, by weight, of about 10% W, about 10% Co, about 8% Cr, about 5% Al, about 3% Ta, about 1% Hf, about 1% Ti, about 0.7% Mo, about 0.2% C, a balance of Ni, and incidental impurities.

In one embodiment, the braze material 103 has a composition, by weight, of between about 15.0% and 17.0% Mo, between about 14.5% and 16.5% Cr, between about 4.0% and about 7.0% Fe, between about 3.0% and about 4.5% W, up to about 2.5% Co, a balance Ni, and incidental impurities.

In one embodiment, the braze material 103 has a composition, by weight, of about 16% Cr, about 16.5% Mo, about 4% W, about 5.5% Fe, about 1% Co, a balance Ni, and incidental impurities.

In one embodiment, the braze material 103 has a composition, by weight, of between about 19% and about 21% Cr, between about 2.5% and about 3.5% Ta, between about 2.5% and about 3.5% B, between about 0.003% and about 0.005% Y, a balance Ni, and incidental impurities.

In one embodiment, the braze material 103 has a composition, by weight, of about 19.7% Cr, about 3.1% Ta, about 3.1% B, about 0.001% Y, a balance Ni, and incidental impurities.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hybrid diffusion-brazing process, comprising:
providing a component comprising a first region having a first tolerance temperature and a second region having a composition different than the first region, wherein the second region has a second tolerance temperature and the first tolerance temperature is greater than the second tolerance temperature;
brazing a braze material to the first region by localized heating to a braze temperature to melt a filler material comprising melting point depressants by a localized heating source during a localized brazing cycle; then
heating the component in a furnace to a diffusion temperature during a diffusion cycle to facilitate diffusion of the melting point depressants into the braze material and the first region of the component, wherein the diffusion temperature is in the range of 1800° F. to 2050° F.;
wherein the second region remains below the second tolerance temperature during the localized brazing cycle;
wherein the second tolerance temperature is in the range of 2100° F. to 2300° F.;
wherein the braze temperature is greater than the second tolerance temperature for the second region and the second tolerance temperature for the second region is greater than the diffusion temperature; and
wherein the localized brazing cycle is performed independent of the diffusion cycle in the hybrid diffusion-brazing process.

2. The hybrid diffusion-brazing process of claim 1, further comprising positioning the localized heating source proximal to the braze material and distal from the second region.

3. The hybrid diffusion-brazing process of claim 1, wherein the localized heating source is an induction heating source.

4. The hybrid diffusion-brazing process of claim 1, wherein temperatures at or above the second tolerance temperature for the second region cause the second region to undergo one or more changes selected from the group consisting of micro-structural change, macro-structural change, melting, re-melting of existing braze joint, deformation, coating spallation, separation of sub-components, fatiguing, cracking, warping, and deforming.

5. The hybrid diffusion-brazing process of claim 1, further comprising maintaining an existing brazing joint in the second region below the second tolerance temperature for the second region.

6. The hybrid diffusion-brazing process of claim 1, wherein the braze material is selected from the group consisting of a pre-sintered preform, a flexible tape made from mixed braze powders, a paste made from the mixed braze powders, and a dry mixture of the mixed braze powders.

7. The hybrid diffusion-brazing process of claim 1, wherein the braze temperature is above 2100° F.

8. The hybrid diffusion-brazing process of claim 1, wherein the furnace is a vacuum furnace.

9. The hybrid diffusion-brazing process of claim 1, wherein the furnace is selected from the group consisting of a retort furnace, and an inert gas furnace.

10. The hybrid diffusion-brazing process of claim 1, wherein the furnace includes the diffusion temperature of between 1850° F. and 2000° F.

11. The hybrid diffusion-brazing process of claim 1, wherein the brazing and the heating form a repair process.

12. The hybrid diffusion-brazing process of claim 1, wherein the brazing and the heating form a manufacture process.

13. The hybrid diffusion-brazing process of claim 1, wherein the component is a gas turbine component.

14. The hybrid diffusion-brazing process of claim 1, wherein the localized brazing cycle is performed for up to about 60 minutes.

15. The hybrid diffusion-brazing process of claim 1, wherein the localized heating source is selected from the group consisting of an induction coil, an arc melting member, a localized heating member, a laser beam, an electron beam, a microwave heating device, a high temperature flame, a radiation heating member, and combinations thereof.

16. The hybrid diffusion-brazing process of claim 1, wherein the first tolerance temperature for the first region is greater than the braze temperature.

* * * * *